United States Patent [19]

Fritts et al.

[11] Patent Number: 5,215,632
[45] Date of Patent: Jun. 1, 1993

[54] FLUORIDE REMOVAL FROM AQUEOUS STREAMS

[75] Inventors: Sharon D. Fritts, Youngstown; Tilak V. Bommaraju; Walter W. Ruthel, both of Grand Island, all of N.Y.

[73] Assignee: Occidental Chemical Corporation, Niagara Falls, N.Y.

[21] Appl. No.: 516,396

[22] Filed: Apr. 30, 1990

[51] Int. Cl.$^5$ .......................... C25B 1/14; C25B 1/24; C25B 9/00

[52] U.S. Cl. ........................................ 204/95; 204/86; 204/128; 204/242; 210/726; 210/95; 423/305; 423/490; 423/555

[58] Field of Search .................. 204/86, 94, 95, 128, 204/242; 210/726, 915; 423/305, 490, 555

[56] References Cited

U.S. PATENT DOCUMENTS

| | | | |
|---|---|---|---|
| 2,902,418 | 9/1959 | Burns | 204/128 |
| 3,970,528 | 7/1976 | Zirngiebl et al. | 204/128 |
| 4,145,282 | 3/1979 | Bruckenstein | 210/713 |
| 4,636,376 | 1/1987 | Maloney et al. | 210/726 |
| 4,702,805 | 10/1987 | Burkell et al. | 204/295 |

OTHER PUBLICATIONS

Encyclopedia of Inorganic Reactions, p. 361.
Industrial Inorganic Chemiocals, vol. 65 (1966:19746d).
Chemical Abstracts 102 (24):206019w.
Chemical Abstract 74 (6):27470t.

Primary Examiner—John Niebling
Assistant Examiner—Kathryn Gorges
Attorney, Agent, or Firm—Wayne A. Jones; Richard D. Fuerle

[57] ABSTRACT

Disclosed is a method of removing fluoride and sulfate ions from an aqueous stream by adding calcium chloride and a source of phosphate ion to the stream to form a first precipitate of calcium sulfate and a compound of calcium, fluoride, and phosphate. The precipitate is separated from the aqueous stream and a source of carbonate ion is added to the stream to form a second precipitate which contains fluoride and calcium. The second precipitate is then separated from the aqueous stream.

9 Claims, 1 Drawing Sheet

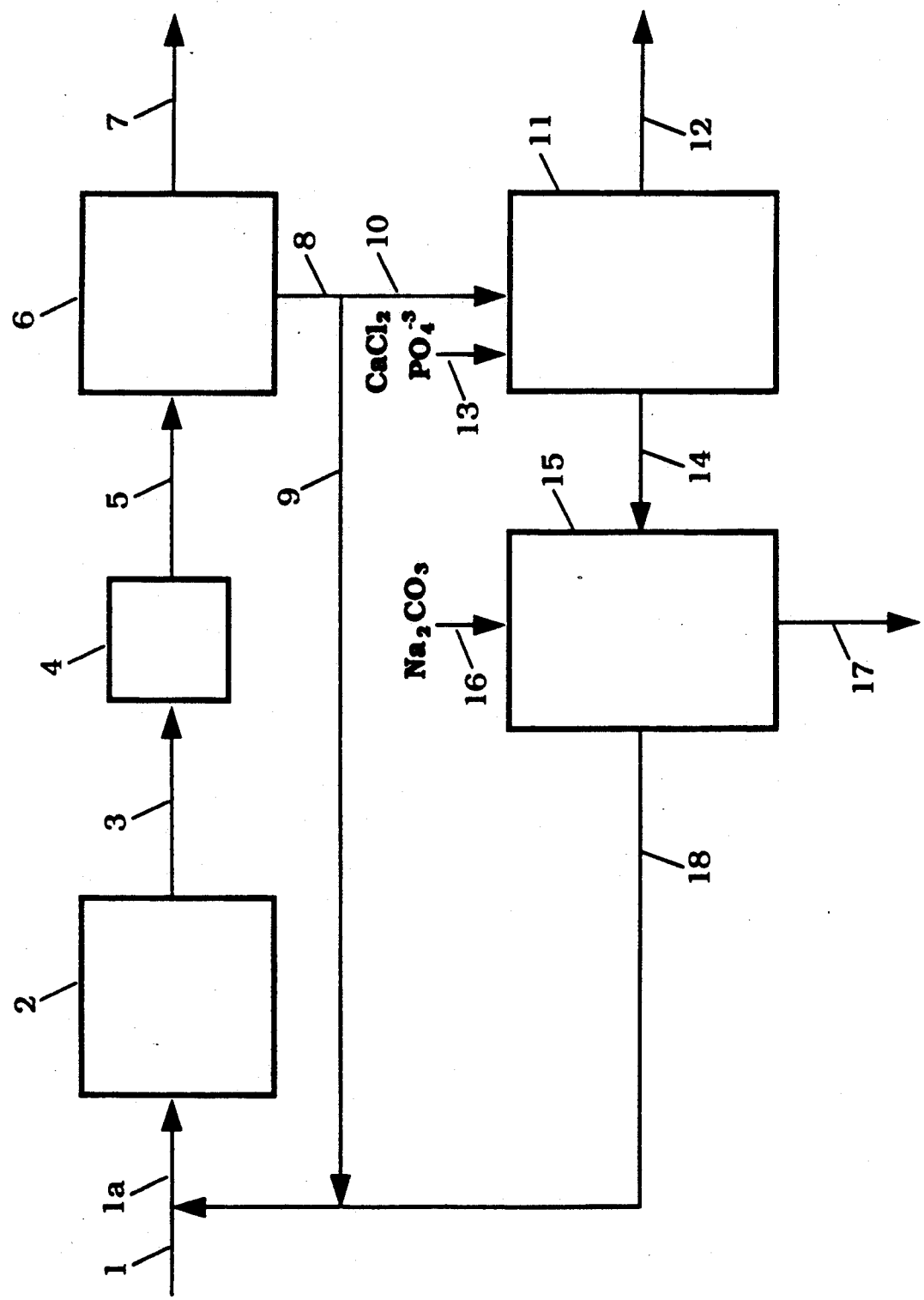

FLUORIDE REMOVAL FROM AQUEOUS STREAMS

BACKGROUND OF THE INVENTION

This invention relates to a method of removing fluoride and sulfate ions from an aqueous stream, particularly a sodium chlorate stream. Specifically, it involves the addition of calcium chloride, a source of phosphate ion, and after removal of a first precipitate, a source of carbonate ion which forms a second precipitate.

Sodium chlorate crystals can be made by electrolyzing a sodium chloride brine stream in an electrolytic cell to produce a solution of sodium chlorate. After concentration, if necessary, the solution is cooled to precipitate the sodium chlorate crystals. In order to increase the efficiency of the crystallizer operation, it is desirable to recycle the mother liquor from the crystallizer, thereby increasing the concentration of sodium chlorate. Typically, the brine will be contaminated with sulfate and fluoride ions. Since sulfate and fluoride ions are not removed with the sodium chlorate crystals and additional sulfate and fluoride ions are constantly being added with the brine, their concentrations tend to build up in the system. It is desirable to keep the fluoride ion concentration below 1 ppm as the fluoride ion in excess of 1 ppm attacks the anode, according to the anode manufacturer. As the sulfate ion concentration builds up, the efficiency of the cell goes down and, eventually, sulfates will precipitate and clog the system. For these reasons, it is necessary, or at least very desirable, to remove sulfate and fluoride ions from the system.

SUMMARY OF THE INVENTION

We have discovered that fluoride ion and sulfate ion can be removed from an aqueous stream by adding calcium chloride and a source of phosphate ion to form a first precipitate, followed, after the removal of the first precipitate, by the addition of carbonate ion to form a second precipitate. Surprisingly, the second precipitate contains significant and substantial amounts of fluoride even though no additional calcium chloride o phosphate ion are added. The method of this invention is effective in removing over 99% of the fluoride that is present without adding deleterious ions to the system.

BRIEF DESCRIPTION OF THE DRAWING

The accompanying drawing is a diagrammatic view of a certain presently preferred embodiment of the process of this invention.

DESCRIPTION OF THE PREFERRED EMBODIMENTS

In the drawing, a brine stream in line 1 enters electrolytic cell 2 where it is electrolyzed to form a solution of sodium chlorate in line 3. The brine stream is typically at a temperature of about 25° to about 60° C. so that the heat from the electrolysis will raise its temperature to about 70° to about 80° C., which is the temperature range that is usually most efficient for producing sodium chlorate. The sodium chloride concentration in the brine stream is typically at or near saturation in order to reduce the amount of water that must be evaporated. The brine stream also typically contains 2 to about 7 g/l of sulfate ion and about 0.1 to about 1 ppm (parts by weight per million parts by weight of brine stream) of fluoride ion. As is known in the art, about 1 to about 5 g/L sodium dichromate may be added to electrolytic cells to increase its efficiency.

A typical composition for the sodium chlorate solution in line 3 is about 550 g/L sodium chlorate, about 120 to 130 g/L sodium chloride, about 1 to about 5 g/L sodium bichromate, and about 1 to about 2 g/L of sodium hypochlorite. The sodium chlorate stream in line 3 is usually passed to a hypo-kill stage 4 for the purpose of removing sodium hypochlorite, which is undesirable because it is very corrosive. Sodium hypochlorite can be removed by the addition of compounds such as sodium sulfite, hydrogen peroxide, sodium formate, or urea.

The sodium chlorate solution then passes through line 5 to crystallizer 6. If the concentration of sodium chlorate in line 5 is below about 600 g/L, it is usually desirable to flash-evaporate some water from the stream in order to raise the concentration of sodium chlorate. The stream is then cooled to about 30° to 40° C. in order to precipitate sodium chlorate crystals which can be removed by, for example, centrifuge through line 7. The mother liquor is then sent through line 8 where, typically, about 70 to about 95% by volume is passed through line 9 and the remaining 5 to 30% is passed through line 10 to precipitator 11.

In precipitator 11, calcium chloride and a source of phosphate ion are added to the brine stream to precipitate calcium sulfate and a fluoride-containing precipitate. The amount of calcium chloride added will depend upon the amount of sulfate one wishes to remove, but it is preferable to precipitate as much sulfate as possible by adding a stoichiometric amount up to about 20 mole % in excess of stoichiometric. Either the calcium chloride or the source of phosphate ion can be added first, or they can be added together. The equation for the removal of sulfate ion with calcium chloride is: $Na_2SO_4 + CaCl_2 + 2H_2O \rightarrow 2NaCl + CaSO_4 \cdot 2H_2O$. While any source of phosphate ion can be used such as, for example, phosphoric acid or calcium or sodium pyrophosphates, tripolyphosphates, orthophosphates, or metaphosphates, it is preferable to use sodium orthophosphate, $Na_3PO_4$, because it is readily available and works well. Again, the amount of phosphate ion added depends upon how much fluoride ion one wishes to remove, but it is preferable to add 3 moles of phosphate ion for every mole of fluoride ion that is present, ±10 mole %, in order to remove as much fluoride ion as possible. While we do not wish to be bound by any theories, we believe that the fluoride ion removed as an apatite according to the equation:

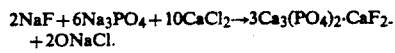

$$2NaF + 6Na_3PO_4 + 10CaCl_2 \rightarrow 3Ca_3(PO_4)_2 \cdot CaF_2 + 20NaCl.$$

After the mixture of calcium sulfate and apatite precipitates has formed, it is necessary to separate the precipitates from the brine in order to prevent the solubilization of the calcium sulfate precipitate as sodium sulfate in the next step. Separation can be accomplished by stirring, settling, and then decanting or filtering the precipitate. The precipitate is removed through line 12 and the brine then passes through line 14 to calcium removal stage 15. In calcium removal stage 15, a source of carbonate ion is added to the brine through line 16. The calcium level in line 14 is about 0.22% by weight and it is decreased to 1 to 2 ppm in calcium removal step 15. Initially, the purpose of adding the source of carbonate ion was to remove the calcium ion that remained in the solution by precipitating it as calcium carbonate. But, surprisingly, it was discovered that a large amount of additional fluoride-containing precipitate also came down when the source of carbonate ion was added to the brine. It is not known whether this fluoride precipitate is identical to the first fluoride precipitate obtained in precipitator 11, and an explanation for the formation of this precipitate has not yet been discovered. While any source of carbonate ion can be used, such as an alkali metal carbonate, an alkali metal bicarbonate, or a mixture of carbon dioxide and an alkali metal hydroxide, sodium carbonate is preferred as it is the most practical source of carbonate ion. While about 50 wt % or more of the fluoride ion is removed with the first precipitate, after the second precipitate less than 91 wt % of the total initial fluoride ion still remains in solution. The second precipitate is then filtered off through line 17 and the remaining chlorate mother liquor passes through line 18.

Since the brine in lines 1 and 18 is continually a source of Ca, which is not removed with the $NaClO_3$ crystals, a supplemental calcium removal stage is desirable. Supplemental calcium removal can be done to portions of, or combinations, streams 9 and 18, or to all or a portion of stream 1a. This can be done in various ways, including, for example, the addition of more carbonate ion or by ion exchange. The calcium level is thereby maintained at acceptable levels, which are typically less than about 1.5 ppm in a crystal sodium chlorate system.

While the method of this invention is particularly applicable to the preparation of sodium chlorate crystals where the mother liquor is recycled from the crystallizer back to the electrolytic cell, it can also be used to remove fluoride and sulfate ions from any industrial stream including, for example, brine purification, chloroalkali manufacturing processes, potassium chlorate manufacturing processes, and sodium chlorate manufacturing processes where there is no recycle. The resulting sodium chlorate crystals can be used to make a variety of products including, for example, chlorine dioxide, which can be used to bleach paper, to make ammonium perchlorate, and for other uses.

The following examples further illustrate this invention.

EXAMPLE 1

In this example, a mother liquor recycle stream was used that had the following composition:

| | |
|---|---|
| sodium chlorate | 36.6% by weight |
| sodium chloride | 10% |
| sodium sulfate | 1.7% |
| sodium dichromate | 0.35% |

The liquor was at a temperature of 30° C. and had a pH of 7. Two samples of the mother liquor were prepared; one containing 10 ppm fluoride ion and the other containing 20 ppm fluoride ion. To the samples was added a stoichiometric amount of calcium chloride which, in some of the tests, was followed by the addition of sodium orthophosphate in a ratio of three moles of phosphate ion per mole of fluoride ion. After the addition of the calcium chloride and the sodium phosphate, the solution was allowed to react, then settle. The solution was decanted. The fluoride ion concentration was measured by fluoride ion selective electrode. Sodium carbonate was then added in an amount stoichiometric with the amount of calcium ion that had been added and, after a ½ hour settling time, the precipitate was removed and the fluoride ion concentration in the mother liquor was again measured. The following table gives the results.

| Reaction Time | Settling Time | 10 ppm $F^-$ (ppm) | 20 ppm $F^-$ (ppm) |
|---|---|---|---|
| ½ hour | ½ hour | 0.99 (0.06) | 1.61 (0.13) |
| 1 hour | ½ hour | 0.52 (0.05) | 1.40 (0.13) |
| 2 hour | ½ hour | 0.32 (0.04) | 1.06 (0.13) |

(The numbers in parentheses are the fluoride ion concentration after the addition of the sodium carbonate.) The above table shows that over 99% of the fluoride ion present was removed using the method of this invention.

EXAMPLE 2

Example 1 was repeated but the fluoride ion concentration was only 1 ppm, making it more difficult to remove a large percentage of the fluoride ion that was present. The calcium chloride and the sodium sulfate were permitted to react for two minutes followed by settling for the time given on the table which follows. The solution was decanted and the $F^-$ concentration was measured. The reaction time with sodium carbonate was two minutes followed by a ½ hour settling time. The following table gives the results.

| Reaction Time after $CaCl_2$ and $Na_3PO_4$ addition (hr) | $F^-$ concentration after $CaCl_2$ and $Na_3PO_4$ addition (ppm) | $F^-$ concentration after $Na_2CO_3$ addition (ppm) |
|---|---|---|
| ½ | 0.56 | 0.04 |
| 1 | 0.51 | 0.04 |

The above table shows that even when the fluoride concentration was only 1 ppm the method of this invention nevertheless removed over 95% of the fluoride concentration that was initially present.

We claim:
1. A method of removing fluoride ions and sulfate ions from an aqueous stream comprising
   (1) adding $CaCl_2$ and a source of phosphate ion to said aqueous stream to form a first precipitate which comprises a mixture of $CaSO_4$ and a compound which comprises calcium, fluoride, and phosphate; and
   (2) separating said aqueous stream from said first precipitate;
   (3) adding a source of carbonate ion into said aqueous stream to form a second precipitate which comprises fluoride and calcium; and
   (4) separating said second precipitate from said aqueous stream.

2. A method according to claim 1 wherein said source of phosphate ion is $Na_3PO_4$.

3. A method according to claim 1 wherein said source of carbonate ion is sodium carbonate.

4. In an electrolytic system wherein a brine stream containing fluoride and sulfate ions is electrolyzed in an electrolytic cell and is sent to a crystallizer, and mother liquor from said crystallizer is recycled to said electrolytic cell, an improved method of removing said fluoride and sulfate ions from said mother liquor wherein the improvement comprises
- (1) adding calcium chloride and a source of phosphate ion to said mother liquor to form a first precipitate which comprises calcium sulfate and a compound which comprises calcium, fluoride, and phosphate;
- (2) separating said mother liquor from said precipitates;
- (3) adding a source of carbonate ion to said mother liquor to form a second precipitate which comprises fluoride; and
- (4) separating said second precipitate from said mother liquor.

5. An electrolytic system according to claim 4 wherein said source of phosphate ion is $Na_3PO_4$.

6. An electrolytic system according to claim 4 wherein said source of carbonate ion is sodium carbonate.

7. In a method producing sodium chlorate crystals wherein a brine stream containing about 2 to about 7 g/l sulfate ion and about 0.1 to about 1 ppm fluoride ion is electrolyzed in an electrolytic cell, then passed to a crystallizer where said sodium chlorate crystals are formed, and mother liquor from said crystallizer is recycled to said electrolytic cell, an improved method of removing said sulfate ion and said fluoride ion from said mother liquor, wherein the improvement comprises
- (1) adding to said mother liquor about a stoichiometric amount to about 20 mole % in excess of a stoichiometric amount of calcium chloride and about three mole, ±10 mole %, of phosphate ion per mole of fluoride ion present in said mother liquor, whereby a first precipitate is formed of calcium sulfate and a compound which comprises calcium, fluoride, and phosphate;
- (2) separating said first precipitate from said mother liquor;
- (3) adding a stoichiometric amount ± about 10 mole %, of a source of carbonate ion to said mother liquor, whereby a second precipitate is formed; and
- (4) separating said second precipitate from said mother liquor.

8. A method according to claim 7 wherein said source of phosphate ion is $Na_3PO_4$.

9. A method according to claim 7 wherein said source of carbonate ion is sodium carbonate.

* * * * *